United States Patent
Kolte et al.

(10) Patent No.: US 11,101,980 B2
(45) Date of Patent: *Aug. 24, 2021

(54) SYSTEM AND METHOD FOR ADDING AND COMPARING INTEGERS ENCRYPTED WITH QUASIGROUP OPERATIONS IN AES COUNTER MODE ENCRYPTION

(71) Applicant: BAFFLE INC., Santa Clara, CA (US)

(72) Inventors: Priyadarshan Kolte, Santa Clara, CA (US); Spence Jackson, Santa Clara, CA (US); Palanivel Rajan Shanmugavelayutham, Santa Clara, CA (US); Mihir Bellare, Santa Clara, CA (US)

(73) Assignee: BAFFLE, INC., Santa Clara, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/401,085

(22) Filed: May 1, 2019

(65) Prior Publication Data

US 2020/0351078 A1 Nov. 5, 2020

(51) Int. Cl.
*H04L 9/06* (2006.01)
*G06F 21/60* (2013.01)
*H04L 9/08* (2006.01)

(52) U.S. Cl.
CPC .......... *H04L 9/0656* (2013.01); *G06F 21/602* (2013.01); *H04L 9/0861* (2013.01); *H04L 2209/46* (2013.01)

(58) Field of Classification Search
CPC . H04L 9/0656; H04L 9/0861; H04L 2209/46; H04L 9/065; G06F 21/602; G06F 21/6245

See application file for complete search history.

(56) References Cited

U.S. PATENT DOCUMENTS

| | | | | |
|---|---|---|---|---|
| 7,280,663 | B1 * | 10/2007 | Golomb | H04L 9/3066 380/255 |
| 8,767,963 | B2 * | 7/2014 | Huang | H04W 4/14 380/270 |
| 8,811,608 | B2 * | 8/2014 | Sella | H04L 9/3093 380/30 |
| 9,521,124 | B2 | 12/2016 | Raykova et al. | |
| 10,289,816 | B1 | 5/2019 | Malassenet et al. | |
| 10,630,478 | B1 * | 4/2020 | Yavuz | G06F 21/6218 |
| 2003/0191950 | A1 * | 10/2003 | Patel | H04L 9/0637 713/189 |
| 2006/0041533 | A1 * | 2/2006 | Koyfman | G06F 21/6227 |
| 2009/0041236 | A1 * | 2/2009 | Gligoroski | H04L 9/065 380/43 |

(Continued)

FOREIGN PATENT DOCUMENTS

WO WO2009115824 A1 9/2009

OTHER PUBLICATIONS

Intel SGX is at https://software.intel.com/en-us/sgx, printed Oct. 1, 2019.

(Continued)

*Primary Examiner* — Aravind K Moorthy
(74) *Attorney, Agent, or Firm* — DLA Piper LLP (US)

(57) ABSTRACT

An encryption system and method that addresses private computation in public clouds and provides the ability to perform operations of encrypted data are provided.

30 Claims, 5 Drawing Sheets

(56) References Cited

U.S. PATENT DOCUMENTS

| | | | |
|---|---|---|---|
| 2011/0040820 A1* | 2/2011 | Rane | H03M 13/1111 |
| | | | 708/441 |
| 2011/0179281 A1* | 7/2011 | Chevallier-Mames | |
| | | | H04L 9/3247 |
| | | | 713/181 |
| 2011/0211692 A1* | 9/2011 | Raykova | H04L 9/3218 |
| | | | 380/46 |
| 2011/0264920 A1* | 10/2011 | Rieffel | H04L 9/008 |
| | | | 713/189 |
| 2012/0002811 A1* | 1/2012 | Smart | H04L 9/085 |
| | | | 380/255 |
| 2012/0159194 A1* | 6/2012 | Anderson | G06F 21/14 |
| | | | 713/190 |
| 2016/0050070 A1* | 2/2016 | Bohli | H04L 9/083 |
| | | | 713/168 |
| 2017/0163424 A1* | 6/2017 | Kafai | H04L 9/3242 |
| 2018/0114028 A1* | 4/2018 | Kafai | H04L 9/3239 |
| 2018/0349867 A1* | 12/2018 | Trieflinger | G06Q 20/3829 |
| 2018/0357427 A1* | 12/2018 | Lindell | G06F 21/602 |
| 2019/0122007 A1* | 4/2019 | Van Antwerpen | G06F 21/79 |
| 2019/0228469 A1* | 7/2019 | Yu | H04L 9/3239 |
| 2019/0286837 A1* | 9/2019 | Yim | H04L 9/0891 |
| 2019/0356468 A1* | 11/2019 | Zeh | H04L 9/0861 |
| 2020/0034550 A1 | 1/2020 | Kim et al. | |
| 2020/0134204 A1* | 4/2020 | Furukawa | G06F 21/64 |
| 2020/0228325 A1 | 7/2020 | Fan et al. | |
| 2020/0228340 A1* | 7/2020 | Blackhurst | H04L 63/0861 |
| 2020/0259651 A1* | 8/2020 | Mohassel | H04L 9/0618 |
| 2020/0267144 A1* | 8/2020 | Wagner | G06F 21/6245 |
| 2020/0366462 A1* | 11/2020 | Kolte | H04L 9/0869 |
| 2021/0167946 A1 | 6/2021 | Bitan et al. | |

OTHER PUBLICATIONS

Microsoft SEAL is at https://www.microsoft.com/en-us/research/project/microsoft-seal/, printed Oct. 1, 2019.

Cybernetica is at https://sharemind.cyber.ee/, printed Oct. 1, 2019.

Costan, Victor et al., entitled, "Intel SGX Explained," Computer Science and Artificial Intelligence Laboratory, Massachusetts Institute of Technology, 2016, 118 pp., https://eprint.iacr.org/2016/086.pdf.

Chen, Hao et al., entitled, "Simple Encrypted Arithmetic Library—SEAL v2.2," Microsoft Research, Royal Holloway, University of London, 33 pp., https://www.microsoft.com/en-us/research/wp-content/uploads/2017/06/sealmanual_v2.2.pdf.

Bogdanov, Dan et al., entitled, "Sharemind:aframeworkforfastprivacy-preserving computations," Univeristy Tartu, AS Cybernetica, 23pp., https://eprint.iacr.org/2008/289.pdf.

Bellare, Mihir, entitled, "Encryption Translation: How to Inherit Standard Compliance," UCSD, Baffle, Inc. (Dec. 18, 2018), 27 pp.

Chenette, Nathan et al., entitled, "Practical Order-Revealing Encryption with Limited Leakage," Rose-Hulman Institute of Technology, Stanford University, Facebook, Inc., 27 pp.

* cited by examiner

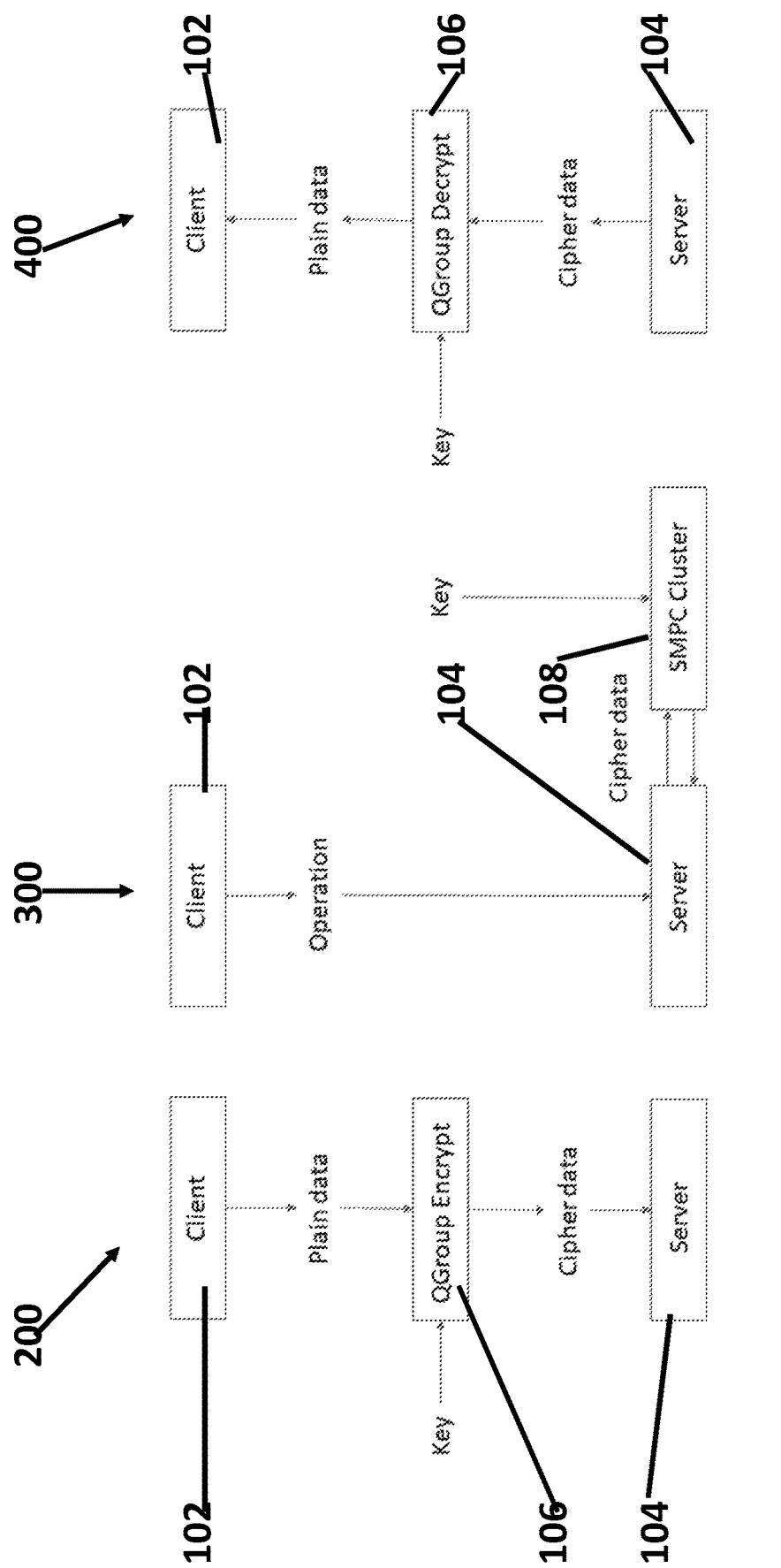

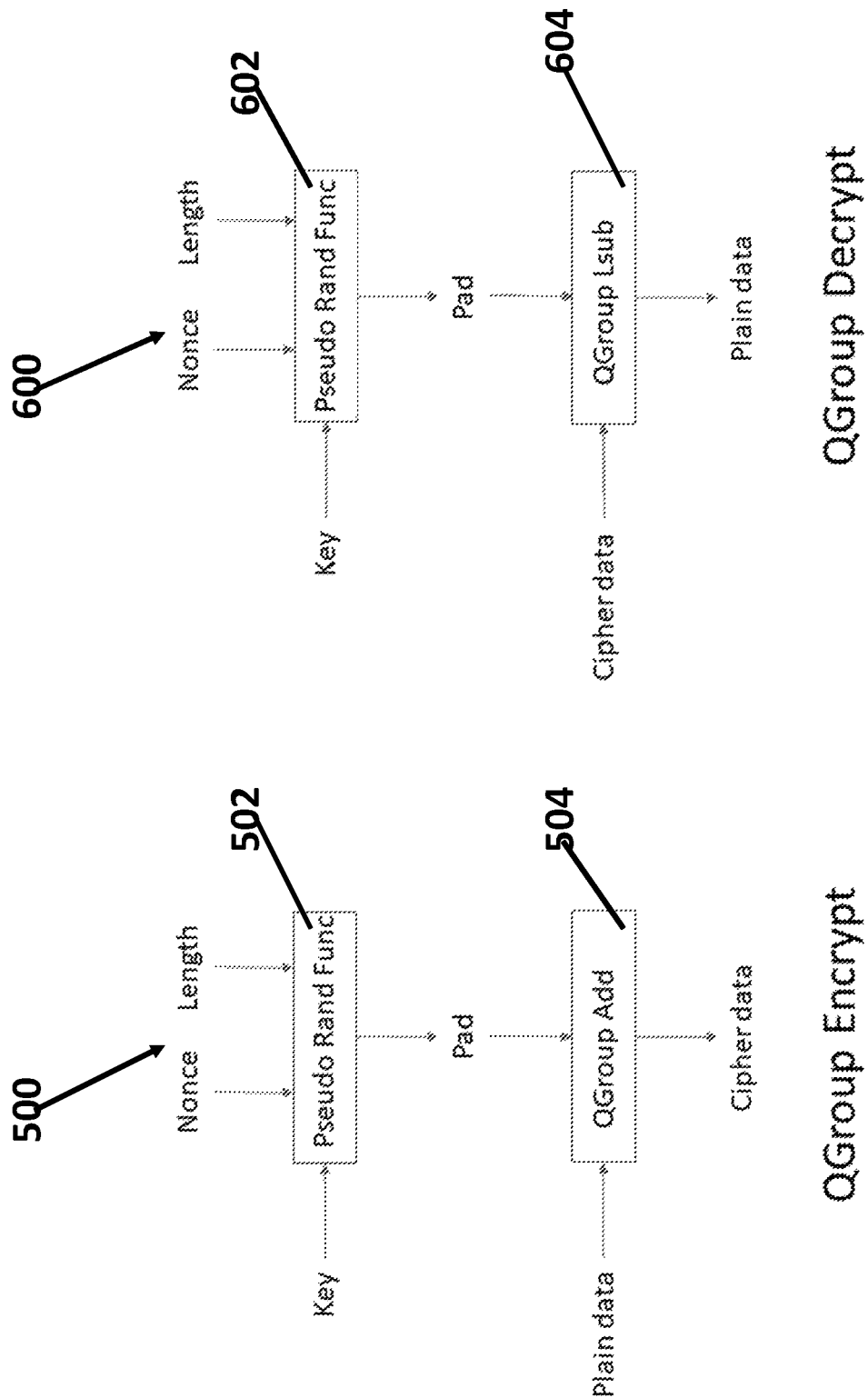

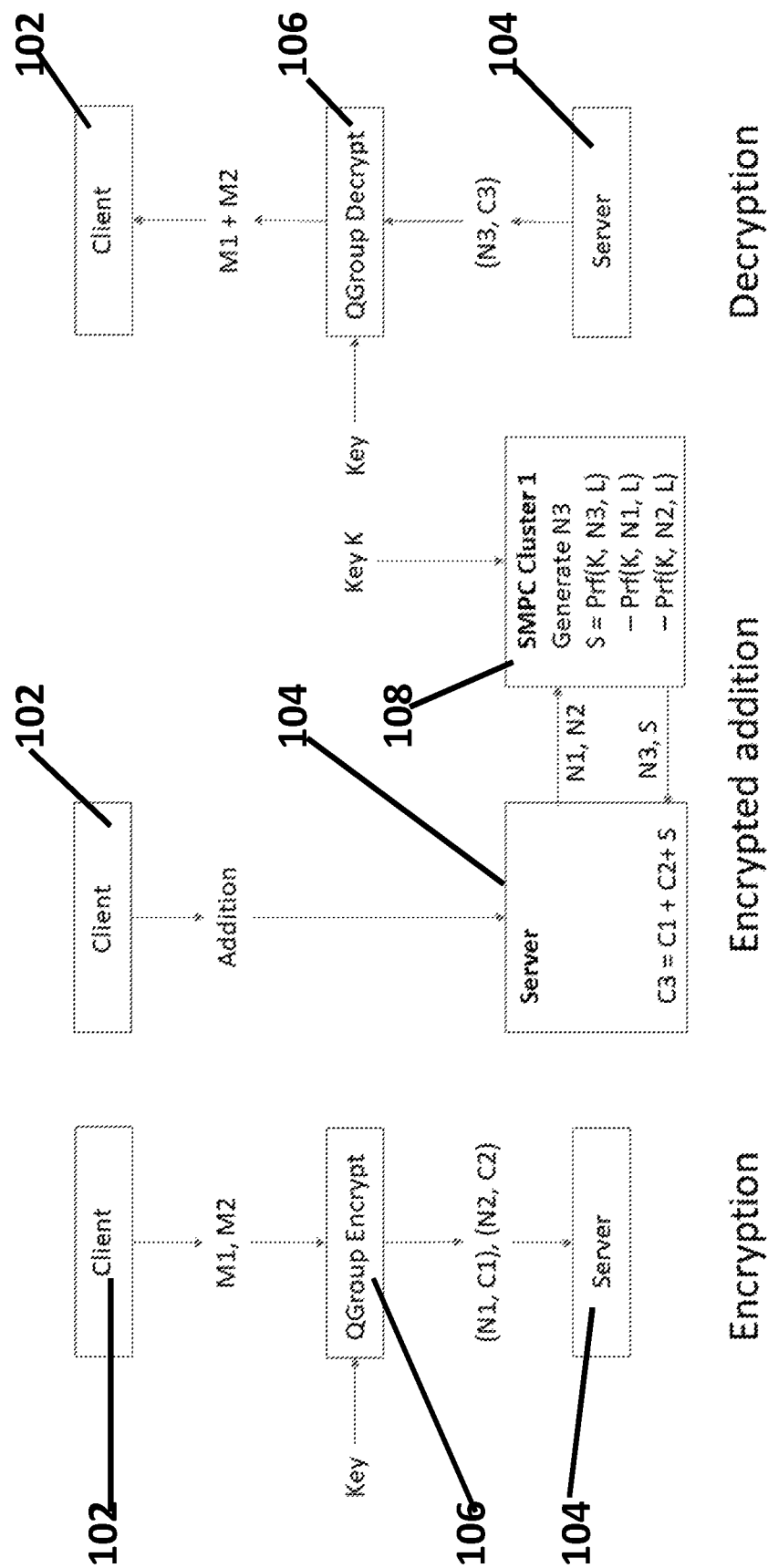

SYSTEM AND METHOD FOR ADDING AND COMPARING INTEGERS ENCRYPTED WITH QUASIGROUP OPERATIONS IN AES COUNTER MODE ENCRYPTION

FIELD

The disclosure relates generally to cryptography and more particularly to cryptography used for computer data privacy.

BACKGROUND

When data is encrypted with the current NIST standard AES Counter Mode (CTR-XOR) symmetric key encryption scheme, the only operation that can be performed on the encrypted data is decryption. In particular, it is not possible to Add or Compare (for Less Than) two encrypted integers without first decrypting both ciphertexts. Since the standard CTR-XOR encryption inhibits useful operations on encrypted data such as Add and LessThan operations, it is desirable to provide an encryption technique that provides data security, but permits the useful operations on the encrypted data.

The above problem is especially acute in the context of private computation in public clouds, but also exist in other areas. To date, there have been four solutions to the above problem that each have limitations and/or drawbacks. The current solutions are:

a. Secure hardware extensions such as Intel Software Guard Extensions (SGX).

b. Fully Homomorphic Encryption (FHE) schemes such as the Simple Encrypted Arithmetic Library (SEAL) from Microsoft.

c. Secure Multiparty Computation (SMPC) schemes such as Sharemind from Cybernetica.

d. QGroups have been previously proposed in cryptography research to generate ad hoc stream ciphers, asymmetric key cryptosystems, and message digests.

The hardware extension solutions, such as SGX, have great performance, but they require the use of specialized hardware and software authentication infrastructure from Intel. Furthermore, SGX in particular is vulnerable to side-channel attacks such as Spectre, Meltdown, and Foreshadow that can compromise confidentiality, so mitigation techniques are being actively developed for newer processors.

The FHE techniques promise great security, but are impractically slow. For example, state of the art FHE implementations take seconds to evaluate a single AES encryption operation compared to nanoseconds for AES in hardware. Current research is exploring methods for speeding up these computations, but that research has not presently provided a commercially practical solution for the above problem.

The known SMPC techniques have good balance between performance and security. However, current solutions, such as Sharemind, are too slow because they use more complex protocols for more stringent security guarantees.

The ad hoc stream ciphers constructed using QGroups are fast, but they solve a different problem of encrypting large messages. The public key crypto systems and message digests based on QGroups also target different problems and not the problem set forth above.

Thus, it is desirable to provide an encryption system and method that addresses the private computation in public clouds and provides the ability to perform operations of encrypted data and it is to this end that the disclosure is directed.

BRIEF DESCRIPTION OF THE DRAWINGS

FIG. 2 illustrates an encryption process that can be performed using the system in FIG. 1;

FIG. 3 illustrates an encrypted operation process that can be performed using the system in FIG. 1;

FIG. 4 illustrates a decryption process that can be performed using the system in FIG. 1;

FIG. 5 illustrates further details of the encryption process shown in FIG. 2;

FIG. 6 illustrates further details of the decryption process shown in FIG. 4;

FIG. 7 illustrates an encryption process for an encrypted addition process that can be performed using the system in FIG. 1;

FIG. 8 illustrates the encrypted addition process that can be performed using the system in FIG. 1;

FIG. 9 illustrates the decryption process for the encrypted addition process;

DETAILED DESCRIPTION OF ONE OR MORE EMBODIMENTS

The disclosure is particularly applicable to a system for outsourcing of a private computation to a public cloud such that the confidentiality of the data is maintained during operations on the data in the public cloud and it is in this context that the disclosure will be described. It will be appreciated, however, that the system and method has greater utility since it may be used for/with any system in which it is desirable to provide encryption for security while also allowing operations to be performed on the encrypted data. The system and method replaces the Xor function of conventional CTR-XOR with a quasigroup (abbreviated as QGroup) operation to enable computations that can be performed without decryption in order to maintain confidentiality in a public cloud. The system and method also may leverage a SMPC system.

Figure 1:
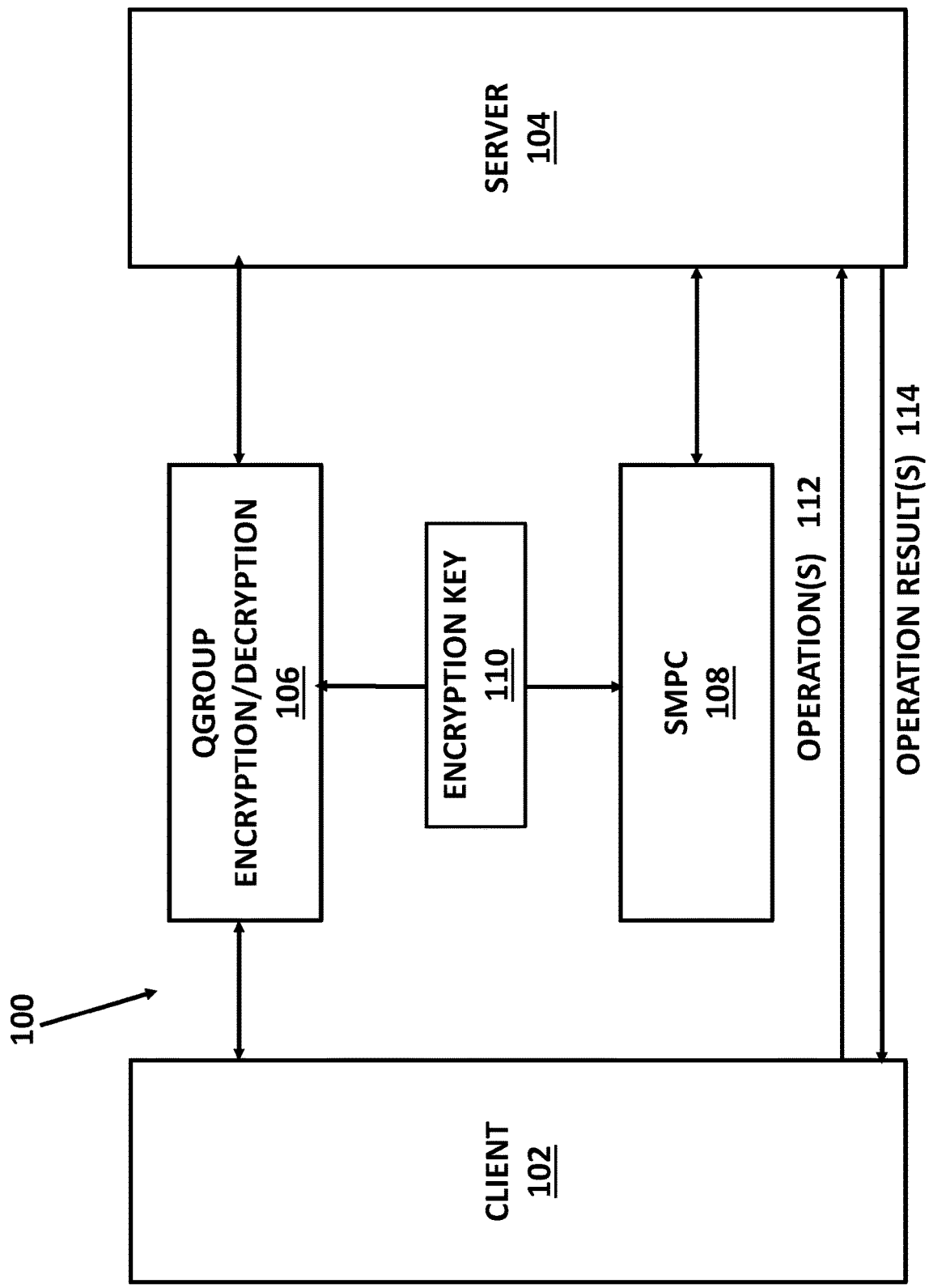
FIG. 1 illustrates an example embodiment of a system that performs encryption and facilitates operations on encrypted data.

FIG. 1 illustrates an example embodiment of a system 100 that performs encryption and facilitates operations on encrypted data. In the example embodiment, a client 102 and a server 104 are shown that communicate with each other, but the system may be implemented with a plurality of clients and a plurality of servers communicating each other. Each client 102 may be a computing device that has a processor, memory, I/O devices and a display and may be executing a plurality of lines of instructions/computer code (an application, a piece of code, a mobile application, etc.) that are requesting one or more operations, such as an addition operation or a less than operation, to be performed on encrypted data. For example, the computing device for each client 102 may be a personal computer, a laptop computer, a tablet computer, a terminal and the like. Each server 104 may be a computer that has a processor, memory, I/O devices and a display and may be executing a plurality of lines of instructions/computer code (an application, a piece of code, a mobile application, etc.) that manage the client requested one or more operations and facilitate the operations on the encrypted data. For example, the computer for each server 104 may be a server computer, one or more cloud computing resources, one or more virtual computer resources, one or more blade servers, etc.

The system 100 may further comprise a QGroup encryption/decryption portion 106 that is connected between each client and each server and manages the encryption and decryption operations as described below. The QGroup encryption/decryption portion 106 may be implemented as one or more computer systems that have at least one processor, memory, I/O devices and may be executing a plurality of lines of instructions/computer code (one or more applications, pieces of code, mobile applications, etc.) that perform the encryption and decryption operations between each client 102 and the server 104 as described below.

The system may further comprise a known secure multi-party computation (SMPC) cluster 108 connected to the server 104 that assists in the performance of the requested operations on the encrypted data as described below in more detail. The SMPC cluster 108 may be implemented as one or more computer systems that have at least one processor, memory, I/O devices and may be executing a plurality of lines of instructions/computer code (one or more applications, pieces of code, mobile applications, etc.) that assists in the performance of the requested operations on the encrypted data as described below in more detail. The QGroup encryption/decryption portion 106 and the SMPC cluster 108 each may be implemented on the same or different computers as each other. In more detail, the QGroup encryption portion 106 may be implemented on the same system as the client 102 or on a separate system, but it is never implemented on the same system as the server 104 because that would make the encryption keys available on the server 104. Furthermore, each of the QGroup encryption/decryption portion 106 and the SMPC cluster 108 may be implemented on the same or different computers than the server 104. As shown in FIG. 1, an encryption key 110 may be provided at times to each of the QGroup encryption/decryption portion 106 and the SMPC cluster 108 to perform the encryption/decryption and the operations on the encrypted data. Each client may generate one or more operation(s) 112 on encrypted data and the server 104 will return results 114 for those operation(s) to the client as described below.

FIG. 2 illustrates an encryption process 200, FIG. 3 illustrates an encrypted operation process 300 and FIG. 4 illustrates a decryption process 400 that can be performed using the system in FIG. 1. Each of these processes may use one or more of the system elements 100-110 shown in FIG. 1 to perform the processes. For the SMPC cluster 108 protocol, the client 102 generates plain data items and the server 104 stores cipher data items (encrypted data) as shown in FIG. 2. The overall operation to perform operations on encrypted data using, for example the system in FIG. 1, may include three phases: Encryption 200, Encrypted operation 300, and Decryption 400.

The first phase 200 uses a secret key (previously generated using an encryption scheme or generated at the time of the encryption using the encryption scheme, such as the QGroups encryption scheme), with the QGroup operation element 106 to encrypt the plain data from the client that is then stored encrypted in the server 104. The second phase 300 performs an operation 112 initiated by the client 102 using an SMPC protocol between the server 104 and the SMPC 108 cluster of machines that have access to the same secret key that was used to encrypt the client data. The SMPC 108 protocol exchanges cipher data and other information between the server 104 and the other computers in the cluster 108 such that the confidentiality of the data is not compromised even if the network traffic, memory, and internal computation states on the server or any one of the computers in the cluster is observed by an attacker. Although some of the computers in the SMPC cluster 108 have access to the secret key, the SMPC protocols ensure that confidentiality is not compromised even if one of the computers holding the secret key is observed by an attacker as long as that attacker does not simultaneously attack the server 104. The third phase 400 takes the cipher data from the server 104 and decrypts it using the same secret key using a QGroup decrypt operation 106 to produce plain data for the client 102.

FIG. 5 illustrates further details of the encryption process 200 shown in FIG. 2 and FIG. 6 illustrates further details of the decryption process 400 shown in FIG. 4. The system in FIG. 1 may use the QGroup Encrypt 500 and QGroup Decrypt 600 operations as the encryption scheme. The first step 502, 602 of both operations uses a Pseudo Random Function (Prf), which is a cryptographic function such as AES encryption or HMAC-SHA message digest, to generate a pseudo-random pad that is then combined with the data using a QGroup Add or Lsub operation 504, 604 in the second step to produce the result (either cipher data in FIG. 5 or plain data in FIG. 6).

In more detail, the first step 502, 602 takes a Nonce N which is a random number that is used just once, a length L which is the number of bits in the data, and a secret key K that is used by the Prf. The NIST standard AES Counter Mode (CTR-XOR) uses the AES encryption function as the Prf and the Xor function as the QGroup operation. The NIST standard describes how CTR-XOR encryption takes plain data M of length L bits, a nonce N, and a secret key K to first generate a set of m=ceiling(L/128) input blocks of 128 bits each derived from N, N+1, . . . , N+m−1, then encrypts each input block using AES encryption with key K to generate m output blocks, and finally concatenates all m output blocks to generate the pseudo-random pad P of length L bits. In the second step of CTR-XOR encryption, the pseudo-random pad P is XORed with the plain data M to produce cipher data C with L bits that is then stored along with the nonce N as the ciphertext (N, C). The system and disclosed processes generalizes the known Prf function used in the first step of the CTR-XOR to be any cryptographic Pseudo Random Function and it generalizes the Xor operation in the second step of CTR-XOR to be any QGroup operation 504.

The QGroup G consists of the set G.S that contains all binary strings of length L along with three operations: G.Add, G.Lsub, and G.Rsub. The G.Add operation takes any two elements A and B from set G.S and produces another element C in set G.S. The G.Lsub operation takes any two elements A and C from set G.S and produces a unique element B from the set such that G.Add(A, B)=C. The G.Rsub operation takes any two elements B and C from set G.S and produces a unique element A in the set such that G.Add(A, B)=C. The G.Lsub operation is known as the left-inverse and the G.Rsub operation is known as the right-inverse for the G.Add operation.

The CTR-QGroup scheme shown in FIGS. 5 and 6 selects a QGroup and then replaces the Xor operation of the NIST standard CTR-XOR with QGroup Add 504 for encryption and QGroup Lsub 506 for decryption as shown. If the QGroup chosen is G, the intermediate cipher block produced by encrypting the nonce N using key K is the pseudo-random pad P=Prf(K, N, L) and the cipher data produced by QGroup Encrypt for plain data M is cipher data C=G.Add(P, M). The QGroup Decrypt function for cipher data C uses the same pseudo-random pad P=Prf(K, N, L) as input to the G.Lsub function to decrypt the cipher data C to produce plain data M=G.Lsub(P, C).

The NIST standard CTR-XOR can be seen as a specific instantiation of the QGroup scheme in which the XOR.Add, XOR.Lsub, and XOR.Rsub functions are all Xor as shown below.

$$XOR.\text{Add}(P,M)=Xor(P,M)$$

$$XOR.L\text{sub}(P,C)=Xor(P,C)$$

$$XOR.R\text{sub}(M,C)=Xor(M,C)$$

A minor variation on the standard CTR-XOR is to introduce a constant H of length L bits and perform the Xor of the inputs with the constant H as shown below:

$$XOR2.\text{Add}(P,M)=Xor(P,M,H)$$

$$XOR2.L\text{sub}(P,C)=Xor(P,C,H)$$

$$XOR2.R\text{sub}(M,C)=Xor(M,C,H)$$

For example, using a constant H of all 1 bits produces the CTR-XNOR encryption scheme. The CTR-XNOR scheme is different from the standard CTR-XOR, but it does not provide any appreciable benefit over CTR-XOR.

The processes described below may be used to address the problem of outsourcing private computation to public clouds and provide a technical solution that provides data security with encryptions but permits operations on the encrypted data (without sacrificing security) that examples of those operations are now described.

The first Qgroup encryption shown in FIGS. 5 and 6 may use modulo $2^L$ addition and subtraction to generate the CTR-ADD symmetric encryption scheme as follows $$ADD.\text{Add}(P,M)=(P+M)\bmod 2^L$$

$$ADD.L\text{sub}(P,C)=(C-P)\bmod 2^L$$

$$ADD.R\text{sub}(M,C)=(C-M)\bmod 2^L$$

The second QGroup uses modulo $2^L$ addition and subtraction to generate CTR-SUB as follows:

$$SUB.\text{Add}(P,M)=(P-M)\bmod 2^L$$

$$SUB.L\text{sub}(P,C)=(P-C)\bmod 2^L$$

$$SUB.R\text{sub}(M,C)=(C+M)\bmod 2^L$$

The benefit of CTR-SUB over CTR-ADD is that the SUB.Add and SUB.Lsub functions are structurally identical, so the same function implementation is used for both encryption and decryption.

Many other QGroup operations can be used for encryption because of a security proof that replacing the Xor with any QGroup Add operation yields a symmetric key encryption scheme that is just as secure as the NIST standard AES CTR-XOR encryption. A QGroup on a set with N elements is defined by its Add function which is represented by a 2 dimensional Cayley table that contains N rows and N columns indexed 0 to N−1 in which each entry is the result of Add(row_index, column_index). The Add table for a QGroup is a Latin Square because the Lsub function requires that no entry in a column be repeated and the Rsub function requires that no entry in any row be repeated. Thus, the number of possibilities for Add functions is at least N! (N−1)! . . . 2! 1! and a large number of secure encryption schemes are possible.

Of all possible QGroup encryption schemes, the system and processes disclosed may use QGroups G with set G.S containing $2^L$ elements of binary strings of length L and the G.Add function of the form:

$$G.\text{Add}(P,M)=(D*P+E*M+H)\bmod 2^L$$

where + indicates modulo-$2^L$ addition, * indicates modulo-$2^L$ multiplication, D and E are both constants from the set G.S that are relatively prime to $2^L$, and H is another constant from the set G.S.

Choosing D=1, E=1, H=0 in the definition of G.Add gives us the QGroup for the CTR-ADD encryption scheme whereas choosing D=1, E=−1, H=0 gives us the QGroup for the CTR-SUB encryption scheme.

Using the algebraic properties of modulo-$2^L$ arithmetic, a little rearrangement of the definition G.Add=(D*P+E*M+H) mod $2^L$ reveals that such QGroups G satisfy the constraint that for all P and all M we have: G.Add(P, M)= (G.Add(P, 0)+E*M) mod $2^L$ where 0 is the string of L 0 bits. This constraint, in turn, implies that for any function F of the form F(X, Y)=(A*X+B*Y+Q) mod $2^L$, we have the modulo-$2^L$ equality F(G.Add(P1, M1), G.Add(P2, M2))=F(G.Add (P1, 0), G.Add(P2, 0))+E*F(M1, M2). Thus, the result of an operation on the plain texts E*F(M1, M2) can be obtained by combining the result of the function on the cipher texts F(C1, C2) on the Server 104 with the result of the function on the pads F(Add(P1, 0), Add(P2, 0)) on the SMPC 108 cluster computer 1.

Choosing A=1, B=1, Q=0 in the equation F(X, Y)=(A*X+ B*Y+Q) mod $2^L$, results in F(X, Y)=X+Y and gives an expression for E*(M1+M2) that is then combined with the constraint G.Add(P, M)=G.Add(P, 0)+E*M in which P=P3 and M=E*(M1+M2) to yield the expressions for computing C3 and S in the Addition SMPC protocol/process as shown in FIG. 8. Choosing A=−1, B=1, Q=R in the definition F(X, Y)=(A*X+B*Y+Q) mod $2^L$, results in F(X, Y)=Y−X+R and gives the expressions for computing V and X in the Less-Than protocol/process shown in FIGS. 10 and 11.

Encrypted Addition Operation

FIGS. 7-9 illustrates an encryption process for an encrypted addition process, the encrypted addition process and the decryption process for the encrypted addition process. The benefit of CTR-ADD and CTR-SUB over CTR-XOR is that data encrypted with either of these QGroup encryption schemes can be added as shown by the following SMPC protocol/process shown in FIGS. 7-9 for adding two cipher data.

The encrypted addition process may include the following processes:

a. The Client 102 performs these steps:
  i. Encrypt plain data M1 using QGroups 106 with nonce N1 to produce cipher text (N1, C1) for storage on the Server 104,
  ii. encrypt plain data M2 using QGroups 106 with nonce N2 to produce cipher text (N2, C2) for storage on the Server 104, and
  iii. initiate an Addition operation of the two cipher texts on the Server 104.

b. The Server 104 sends (N1, N2) to the SMPC Cluster 108 Computer 1.

c. The SMPC Cluster 108 Computer 1 performs these steps:
  i. Receive (N1, N2) from Server 104,
  ii. generate a new nonce N3,
  iii. with pads Pi=Prf(K, Ni, L) and plain data Mi=0 for i=1, 2, and 3, compute S=Add(P3, 0)−Add(P1, 0)−Add(P2, 0) which simplifies to S=(Prf(K, N3, L)−Prf(K, N1, L)−Prf(K, N2, L)) mod $2^L$, and
iv. send (N3, S) back to the Server 104.
d. The Server 104 continues its processing with these steps:
i. Receive (N3, S) from SMPC Cluster 108 Computer 1,
ii. compute C3=(C1+C2+S) mod $2^L$, and
iii. send (N3, C3) as the cipher text for the sum to the Client 102.
e. The Client 102 decrypts the cipher text (N3, C3) using Lsub to recover the plain data for the addition M1+M2 as shown in FIG. 9.

In this manner, the disclosed system and method provides a technical solution of adding encrypted data while maintaining security in a situation in which private computing is being performed in a public cloud which is a technical problem being solved. As an example, suppose a database in the public cloud contains a table called PAYROLL where each row contains the name of a person and an encrypted number for SALARY. An attacker at the database would not be able to decrypt any salary information without the encryption key. However, the owner of that database and table (Client) could use the Addition operation described above to compute the total expenditure of a department by issuing an SQL query such as SELECT SUM(salary) FROM payroll.

The Addition operation would use the SMPC protocol to compute an encrypted Sum that would be then need to be decrypted by the QGroup decrypt with the appropriate encryption key.

Encrypted Less than Operation

Figures 10, 11:
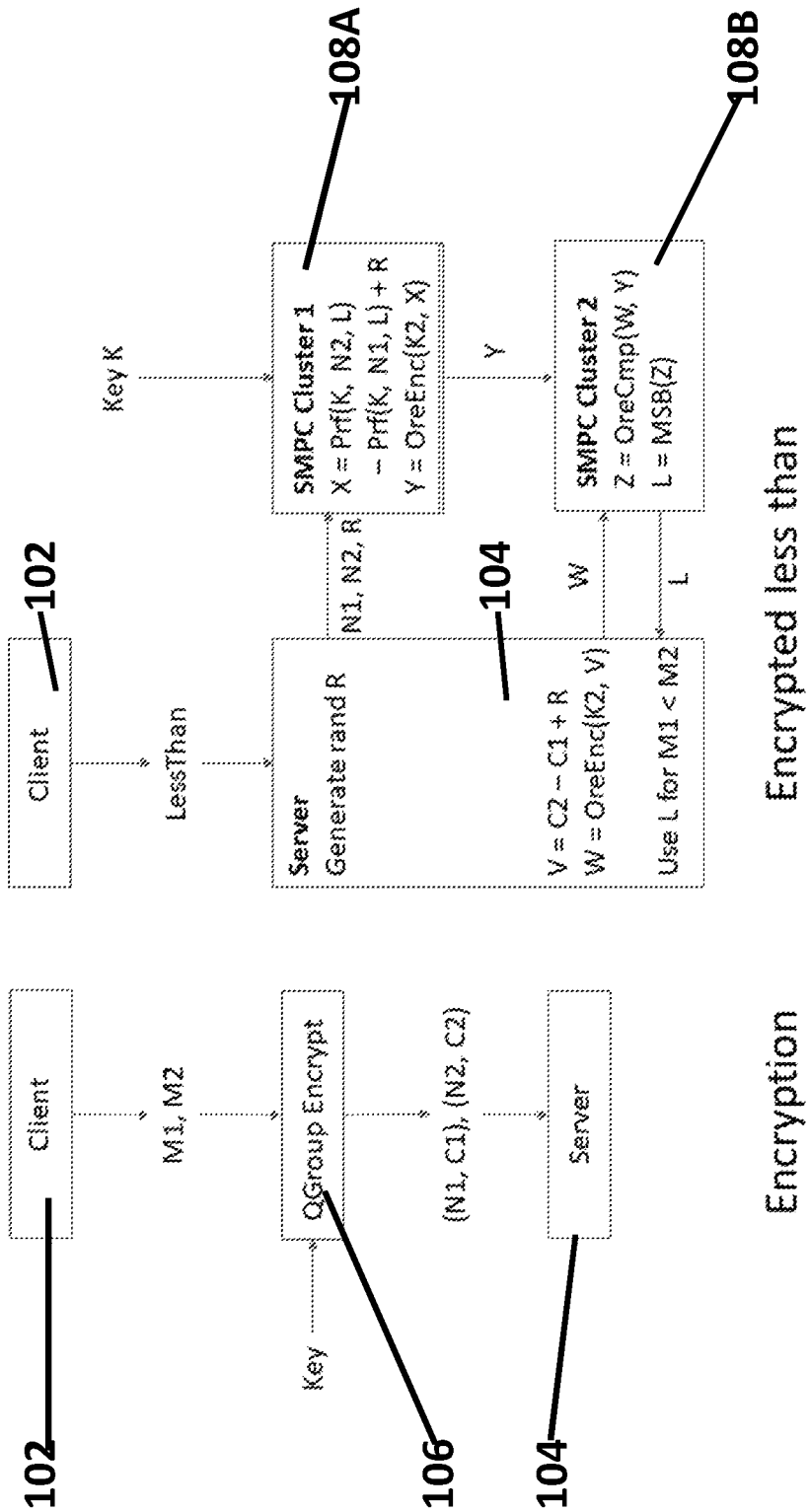
FIG. 10 illustrates an encryption process for an encrypted less than process that can be performed using the system in FIG. 1.
FIG. 11 illustrates the encrypted less than process that can be performed using the system in FIG. 1.

FIG. 10 illustrates an encryption process for an encrypted less than process and FIG. 11 illustrates the encrypted less than process. Cipher texts produced by the CTR-ADD and CTR-SUB encryption schemes can be compared for the LessThan process by the following protocol/process.

In the less than process, the system has the SMPC 108, but uses two computers in the SMPC cluster being SMPC computer 1 108A and SMPC computer 2 108B as shown as in FIG. 11 whose operations are described below. This process relies, in part, on an Order Revealing Encryption (ORE) scheme such as "Practical Order-Revealing Encryption with Limited Leakage" taught by Nathan Chenette et al in 2016. The ORE scheme uses an additional secret key K2 that is shared between the server 104 and SMPC cluster 108A computer 1 to encrypt the operands using a function OreEncrypt. The secret key K2 is not available on SMPC cluster computer 2 108B, but SMPC cluster computer 2 108B executes a function OreCmp to compare two operands for less-than while leaking only the most significant bit of the difference between the operands.

The encrypted less than process may include the following processes:
a. The Client 102 performs these steps:
i. Encrypt plain data M1 with QGroup encryption with nonce N1 to produce
ii. encrypt plain data M2 with QGroup encryption with nonce N2 to produce cipher text (N2, C2) for storage on the Server, and
iii. initiate a LessThan operation of the two cipher texts on the Server 104.
b. The Server 104 performs these steps:
i. Generate a random integer R less than L,
ii. compute V=(C2−C1)+R,
iii. compute W=OreEncrypt(K2, V),
iv. send (N1, N2, R) to the SMPC Cluster computer 1 108A, and
v. send W to SMPC Cluster Computer 2 108B.
c. The SMPC Cluster Computer 1 108A performs these steps:
i. Receive (N1, N2, R) from Server 104
ii. with pads Pi=Prf(K, Ni, L) and plain data Mi=0 for i=1 and 2, compute X=(Add(P2, 0)−Add(P1, 0))+R which simplifies to X=(Prf(K, N2, L)−Prf(K, N1, L))+R,
iii. compute Y=OreEncrypt(K2, X)
iv. send Y to SMPC Cluster Computer 2 108B.
d. The SMPC Cluster Computer 2 108B performs these steps:
i. Receive W from Server 104,
ii. receive Y from SMPC Cluster Computer 1 108A,
iii. compute Z=OreCompare(W, Y),
iv. send result L depending on most significant non-zero bit of Z to Server 104.
e. Server 104 receives result L that determines whether M1<M2 that may be passed back to the client 102. "L" is the result of the LessThan protocol. If M1<M2, then L is set to 1 and if M1>=M2, L is set to 0.

For example, suppose a database in the public cloud contains a table called PEOPLE containing an encrypted column LASTNAME that holds the encryption of the name of a person and an encrypted column BIRTHDATE that holds the encryption of the date of birth (the ciphertext for the encrypted date of birth). An attacker at the database would not be able to decrypt any of the encrypted BIRTHDATE values without the right key. However, the Client would be able to use the encrypted less than operation to answer a query such as SELECT lastname FROM people WHERE birthdate<'2000-01-01'

An attacker at the database would not be able to see what birthdate is being queried for without the decryption key. The attacker would be able to see the number of results that are selected for matching the filter, but would not be able to see the lastnames without the decryption key. A Qgroup decrypt operation with the appropriate key would be able to decrypt the lastnames in the result set of the query.

Results Summary

The QGroup encryption method and SMPC protocols based on this encryption have provable security and good performance. Although not as fast as hardware solutions such as Intel SGX, the disclosed processes do not depend on specific hardware and are not vulnerable to side-channel attacks as described in the background above. The disclosed SMPC LessThan protocol is much faster than previously published protocols such as in the Sharemind system because it reduces multiple rounds of communication between the Server and the SMPC Cluster Computers to a single round. The ad hoc stream ciphers constructed using QGroups maintain the confidentiality of the ciphertext by keeping the QGroup operation a secret and the disclosed system and method uses a proven method that publishes the QGroup as well as the encryption function but keeps just the key secret. The results and efficacy of the disclosed system and method has been shown when implemented for commercial databases such as Cassandra, MySQL, MariaDB, Postgres, MongoDB, Oracle, and Microsoft SQL Server that are deployed in public clouds such as Amazon Web Services and Microsoft Azure.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method, comprising:
encrypting, using QGroup encryption, a first item of plain data and a second item of plain data from a client to generate a first item of cipherdata and a second item of cipherdata that are received by a server,
receiving at the server from the client, an operation request to perform one of a plurality of operations on the first and second items of cipherdata;
performing, using a secure multi-party computation (SMPC) cluster connected to the server, each operation on the first and second items of cipherdata to generate an encrypted result that is passed back to the server; and
returning a plain result to the client wherein returning the plain result further comprises decrypting, using QGroup decryption, the encrypted result.

2. The method of claim 1, wherein the operation further comprises one of an encrypted add operation and an encrypted less than operation.

3. The method of claim 1, wherein encrypting the first and second items of plain data further comprises generating the cipherdata for each of the first item of plain data and the second item of plain data using a QGroup Add operation with a pseudorandom pad and the piece of plain data.

4. The method of claim 3, wherein encrypting the first and second pieces of plain data further comprises generating, for each piece of plain data, the pseudorandom pad using a pseudorandom function, a nonce and a length of the piece of plain data.

5. The method of claim 4, wherein the pseudorandom function is one of an encryption method and a cryptographic message digest.

6. The method of claim 1, wherein decrypting the encrypted result further comprises generating the plain result for the encrypted result using a QGroup Lsub with a pseudorandom pad.

7. The method of claim 6, wherein decrypting the encrypted result further comprises generating the pseudorandom pad using a pseudorandom function, a nonce and a length of the encrypted result.

8. The method of claim 7, wherein the pseudorandom function is one of an encryption method and a cryptographic message digest.

9. The method of claim 1, wherein encrypting the first and second items of plain data further comprises generating the cipherdata for each of the first item of plain data and the second item of plain data using a QGroup Add with a pseudorandom pad and the item of plain data and wherein decrypting the encrypted result further comprises generating the result for the encrypted result using a QGroup Lsub with a pseudorandom pad.

10. The method of claim 9, wherein performing the operation further comprises performing an encrypted add operation on the first and second items of cipherdata.

11. The method of claim 10, wherein performing the encrypted add operation further comprises generating, on a computer in the SMPC cluster, a second nonce and a second pseudorandom pad and computing, on the computer in the SMPC cluster, an encrypted sum based on the first and second items of cipherdata, the second nonce and the second pseudorandom pad.

12. The method of claim 9, wherein performing the operation further comprises performing, using the SMPC cluster, an encrypted less than operation on the first and second pieces of cipherdata.

13. The method of claim 12, wherein performing the encrypted less than operation further comprises generating, at the server, a random integer that is less than the length of the plain data, computing V with a value equal to the random integer and computing W that is a value of an order revealing encryption of V.

14. The method of claim 13, wherein performing the encrypted less than operation further comprises generating, at a first computer of the SMPC cluster, a less than result based on the nonces for the first and second items of plain data and the random integer and computing an order revealing encryption less than result using a second key and the less than result.

15. The method of claim 14, wherein performing the encrypted less than operation further comprises computing, at a second computer of the SMPC cluster, an oreCompare operation on W and the order revealing encryption less than result and sending a result L to the server.

16. A system, comprising:
a server computer;
a computing device capable of connecting to the server computer and issuing an operation from a plurality of operations on encrypted data to the server computer;
a QGroup encryption engine, connected between the computing device and the server computer, that encrypts a first and second item of plain data from the computing device to generate a first item of cipherdata and a second item of cipherdata that are received by the server computer,
a secure multi-party computation (SMPC) cluster connected to the server computer that receives the first and second items of cipherdata, performs each operation on the first and second items of cipherdata and generates an encrypted result in response to each operation on the cipherdata;
the QGroup encryption engine decrypting the encrypted result to generate a result; and
the server computer returning the result to the computing device.

17. The system of claim 16, wherein the operation on the encrypted data further comprises one of an encrypted add operation and an encrypted less than operation.

18. The system of claim 16, wherein the QGroup encryption engine generates the cipherdata for each of the first item of plain data and the second item of plain data using a QGroup Add with a pseudorandom pad and the item of plain data.

19. The system of claim 18, wherein the QGroup encryption engine generates, for each item of plain data, the pseudorandom pad using a pseudorandom function, a nonce and a length of the item of plain data.

20. The system of claim 19, wherein the pseudorandom function is one of an encryption method and a cryptographic message digest.

21. The system of claim 16, wherein the QGroup encryption engine generates the result from the encrypted result using a QGroup Lsub with a pseudorandom pad.

22. The system of claim 21, wherein the QGroup encryption engine generates the pseudorandom pad using a pseudorandom function, a nonce and a length of the encrypted result.

23. The system of claim 22, wherein the pseudorandom function is one of an encryption method and a cryptographic message digest.

24. The system of claim 16, wherein the QGroup encryption engine generates the cipherdata for each of the first item of plain data and the second item of plain data using a QGroup Add with a pseudorandom pad and the item of plain data and generates the result from the encrypted result using a QGroup Lsub with a pseudorandom pad.

25. The system of claim 24, wherein the SMPC cluster performs an encrypted add operation on the first and second items of cipherdata.

26. The system of claim 25, wherein the SMPC cluster generates, on a computer in the SMPC cluster, a second nonce and a second pseudorandom pad and computes, on the computer in the SMPC cluster, an encrypted sum based on first and second items of cipherdata, the second nonce and the second pseudorandom pad.

27. The system of claim 24, wherein the SMPC cluster performs an encrypted less than operation on the first and second items of cipherdata.

28. The system of claim 27, wherein the server generates a random integer that is less than the length of the plain data, computes V with a value equal to the random integer and computes W that is a value of an order revealing encryption of V.

29. The system of claim 28, wherein a first computer of the SMPC cluster generates a less than result based on the nonces for the first and second items of plain data and the random integer and computes an order revealing encryption less than result using a second key and the less than result.

30. The system of claim 29, wherein a second computer of the SMPC cluster computes an oreCompare operation on W and the order revealing encryption less than result and sending a result L to the server.

* * * * *